United States Patent
Safaee et al.

(10) Patent No.: US 11,742,752 B2
(45) Date of Patent: Aug. 29, 2023

(54) DC-DC CONVERTER HAVING TWO RESONANT CIRCUITS AND METHOD FOR CONTROL AND OPERATION OF A DC-DC CONVERTER

(71) Applicant: Inventronics GmbH, Munich (DE)

(72) Inventors: Alireza Safaee, Cupertino, CA (US); Bernhard Siessegger, Unterschleissheim (DE)

(73) Assignee: Inventronics GmbH, Munich (DE)

( * ) Notice: Subject to any disclaimer, the term of this patent is extended or adjusted under 35 U.S.C. 154(b) by 0 days.

(21) Appl. No.: 17/580,658

(22) Filed: Jan. 21, 2022

(65) Prior Publication Data

US 2023/0238878 A1     Jul. 27, 2023

(51) Int. Cl.
| | |
|---|---|
| *H02M 1/08* | (2006.01) |
| *H02M 3/00* | (2006.01) |
| *H02M 7/5395* | (2006.01) |
| *H02M 7/06* | (2006.01) |
| *H05B 45/10* | (2020.01) |
| *H05B 45/3725* | (2020.01) |
| *H02M 1/44* | (2007.01) |
| *H02M 1/12* | (2006.01) |
| *H02M 1/14* | (2006.01) |

(52) U.S. Cl.
CPC ............... *H02M 3/01* (2021.05); *H02M 1/08* (2013.01); *H02M 7/06* (2013.01); *H02M 7/5395* (2013.01); *H05B 45/10* (2020.01); *H05B 45/3725* (2020.01); *H02M 1/126* (2013.01); *H02M 1/14* (2013.01); *H02M 1/44* (2013.01)

(58) Field of Classification Search
None
See application file for complete search history.

(56) References Cited

U.S. PATENT DOCUMENTS

| | | | |
|---|---|---|---|
| 6,034,489 A | 3/2000 | Weng | |
| 10,356,861 B2 | 7/2019 | Safaee | |
| 11,404,911 B2* | 8/2022 | Yates | .................. H02M 3/335 |
| 11,621,585 B2* | 4/2023 | Karalis | .................. H02J 50/80 |
| | | | 307/104 |
| 2010/0052554 A1 | 3/2010 | Zanforlin | |
| 2011/0273909 A1 | 11/2011 | Christopher | |

(Continued)

FOREIGN PATENT DOCUMENTS

WO    2008075389 A1    6/2008

*Primary Examiner* — Wilson Lee
(74) *Attorney, Agent, or Firm* — Gang Yu

(57) ABSTRACT

A resonant DC-DC converter may include an input for inputting a DC supply voltage, an output for providing a DC voltage to a load, an output rectifier to convert the converter voltage into a DC voltage, a resonant half-bridge inverter comprising two switches in series with a first serial resonant circuit to adjust the output current of the converter, and a second serial resonant circuit to block DC current in the converter and provide current continuity within the converter. The resonance of the first serial resonant circuit is measured after every start of the converter and each measurement defines the switching frequency of the half-bridge inverter. The switches of the half-bridge inverter wherein the driving of the half-bridge inverter includes a key gap during operation thereof. The resonance frequency of the second serial resonant circuit is at least slightly above the switching frequency of the half-bridge inverter.

20 Claims, 10 Drawing Sheets

(56) References Cited

U.S. PATENT DOCUMENTS

| | | |
|---|---|---|
| 2011/0316430 A1 | 12/2011 | Cohen et al. |
| 2016/0322910 A1* | 11/2016 | Kovacevic ........ H02M 3/33576 |
| 2017/0373604 A1* | 12/2017 | Chen ....................... H02M 1/36 |
| 2018/0288839 A1 | 10/2018 | Safaee |
| 2020/0153345 A1* | 5/2020 | Mønster ............ H02M 3/33553 |
| 2022/0014093 A1* | 1/2022 | Ammar ................... H02M 3/07 |
| 2022/0158492 A1* | 5/2022 | Gu ............................ H02J 7/02 |
| 2022/0183116 A1* | 6/2022 | Suga ........................ H05B 6/12 |
| 2023/0065763 A1* | 3/2023 | Elferich .............. H02M 1/4241 |

* cited by examiner

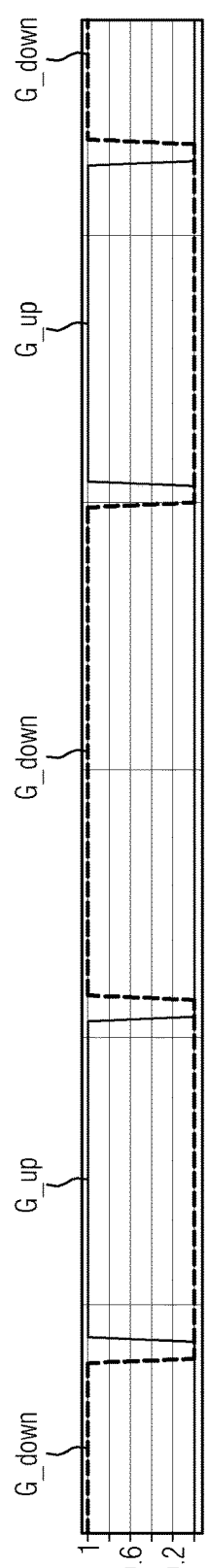
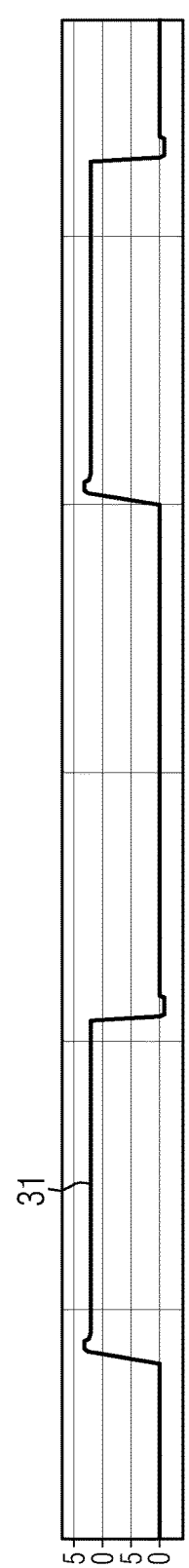
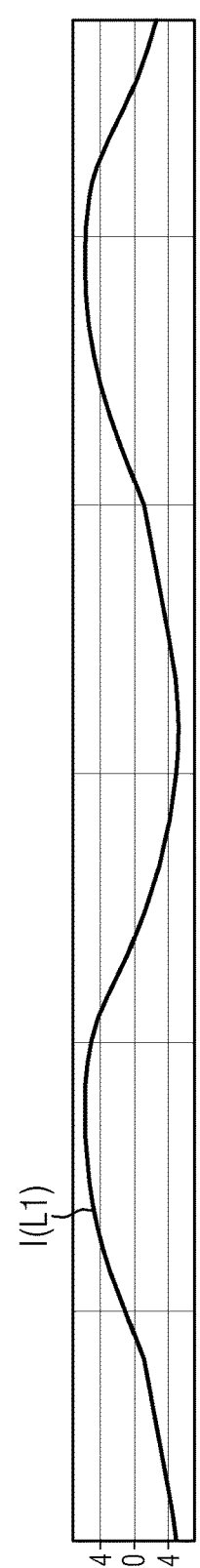
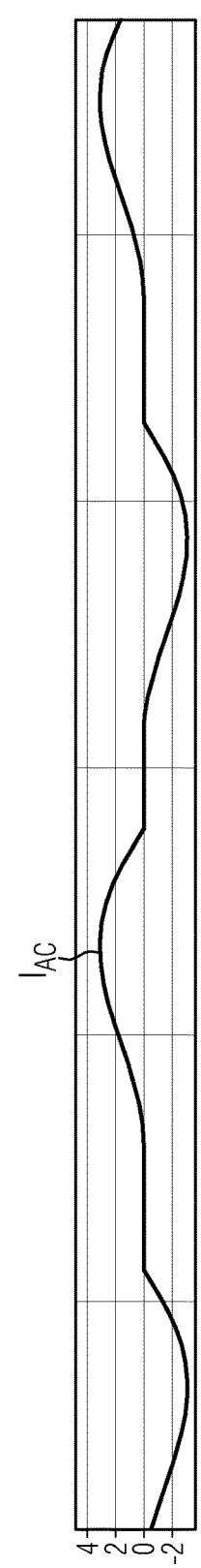
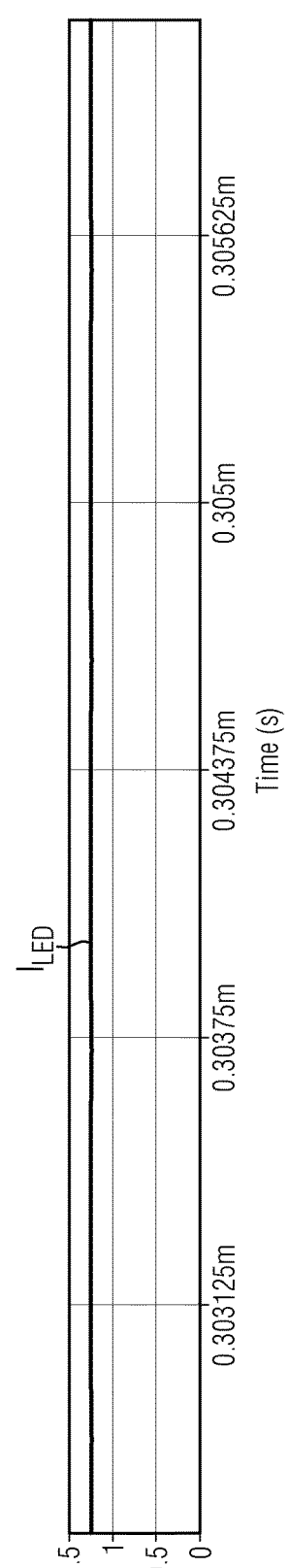

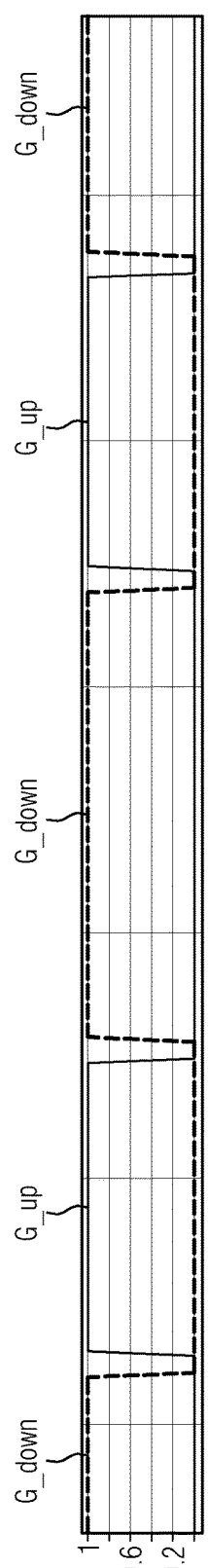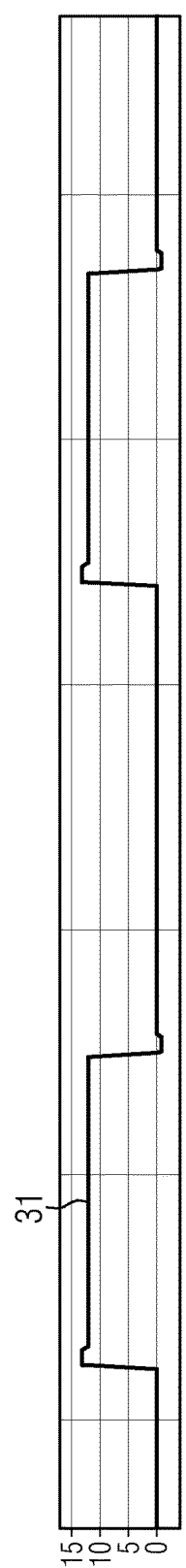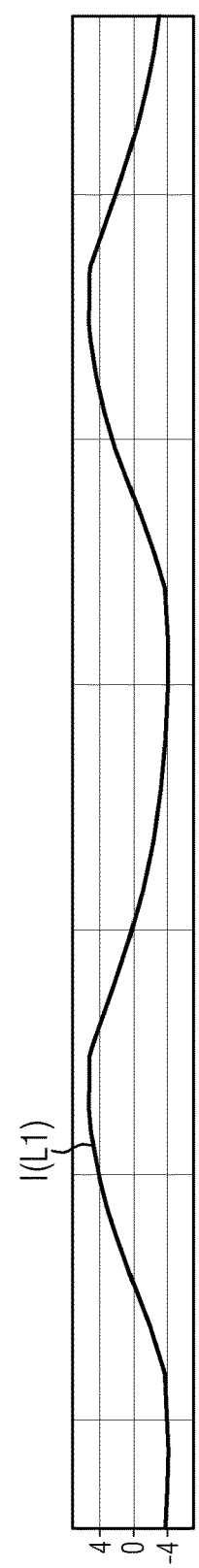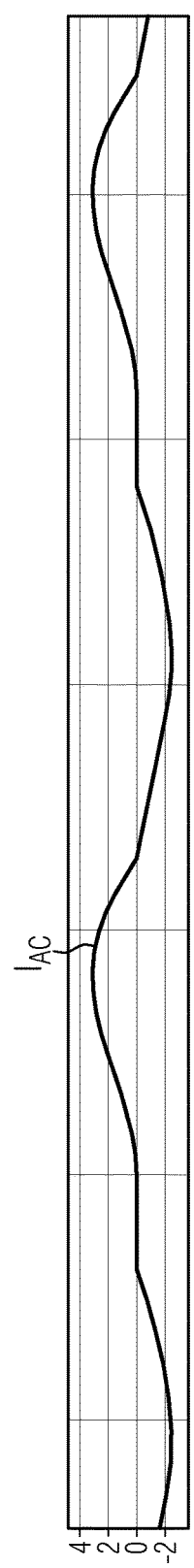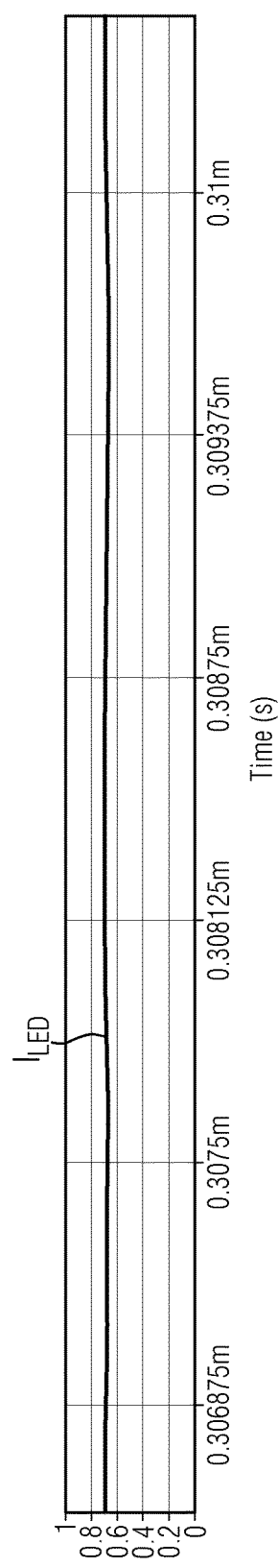

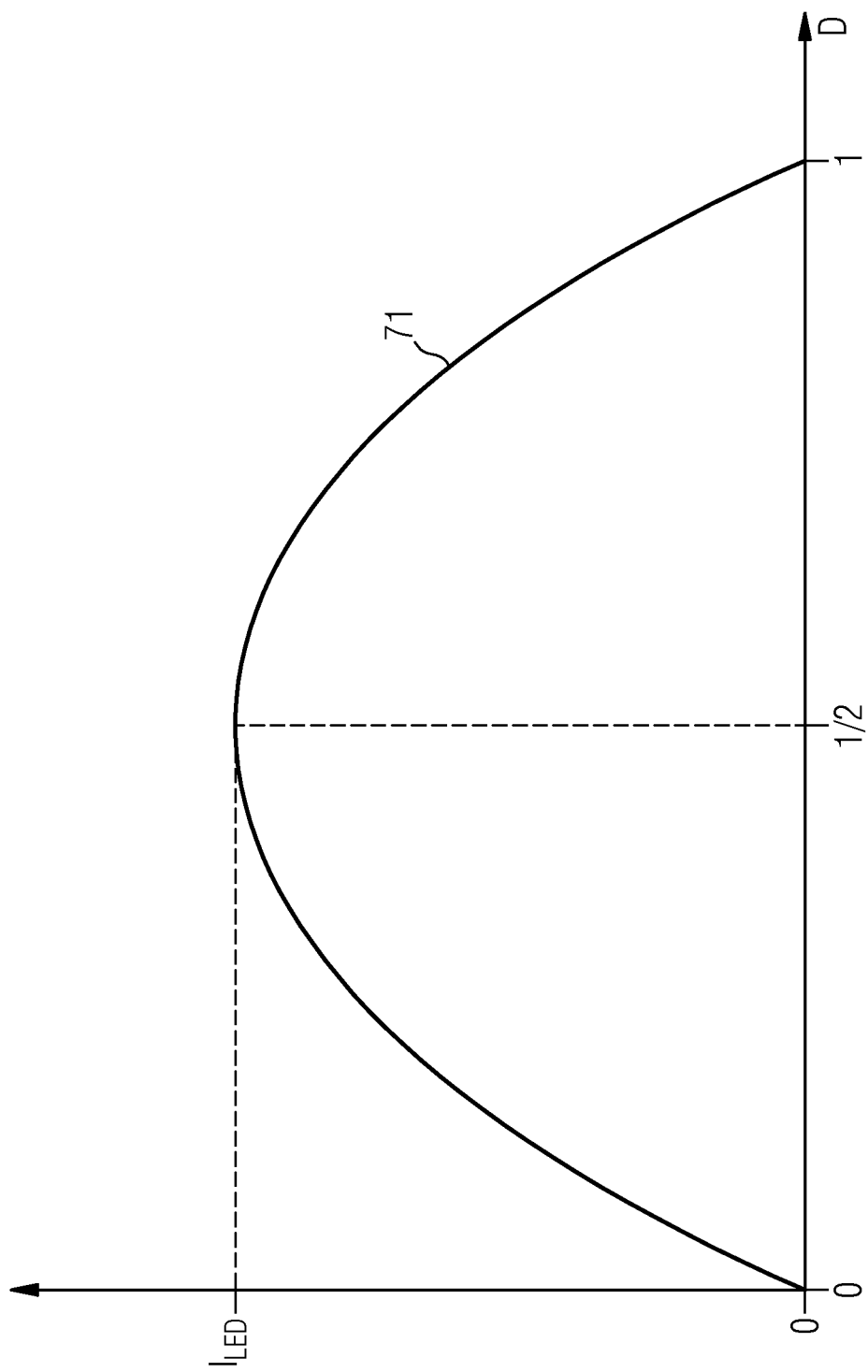

DC-DC CONVERTER HAVING TWO RESONANT CIRCUITS AND METHOD FOR CONTROL AND OPERATION OF A DC-DC CONVERTER

TECHNICAL FIELD

The present disclosure relates to a DC-DC converter having two serial resonant circuits and further relates to a method for controlling the DC-DC converter.

BACKGROUND

Resonant DC-DC converters are often used for powering sensitive electrical loads that need a constant working voltage, which differs from a public mains voltage, or a constant working current like LED loads. The load itself may be almost free of control from the DC-DC converter's controller. The other electrical factor causing an output or load power may widely vary either during a long time period, when the same DC-DC converter feeds power to e.g. several loads, one following the other, or spontaneously, when a load alters its temperature or its power demand.

The first challenge for the resonant DC-DC converter is to minimize the crosstalk between a load and the target for control. In other words, the freedom for the load-dependent electrical factor causing a load power should be enabled as much as possible. The second challenge is to solve the first challenge with as few losses as possible. The third challenge is to keep the necessary size for all components as minimal as possible, as well as keeping the costs low.

According to the state of the art, a closed-loop control circuit which is perfectly adopted to its tasks and surroundings copes with the first challenge; a switch-mode DC-DC converter copes with the second challenge, and a switching frequency that is as high as possible for said DC-DC converter copes with the third challenge. For commodity applications like wall-plug adapters, switching frequencies up to 45 kHz are common, and for high-end applications yielding much higher power densities like on-board CPU power supplies, switching frequencies up to 2 MHz are in use.

Therefore, the frequency of the RF AC voltage ranges from about 20 kHz to about 2 MHz. Frequencies below 20 kHz cause acoustic noise, especially for animals.

The frequency of the RF AC voltage is substantially equal or completely equal to the switching frequency for the inverter of the switch-mode DC-DC converter, the RF AC voltage may show an almost rectangular shape and will be named with "inverter output voltage" in the following. In any case, the graphed shape of the inverter output voltage periodically comprises a first type of time intervals having almost constant voltage levels, and in between the first type of time intervals, there are a second type of time intervals having free voltage shapes when graphed. Because of this non-sinusoidal shape of the converter output voltage, there are a lot of harmonics above frequency of the RF AC voltage. At the start of each time interval of the first type, the inverter is switched on via at least one active electronic switch, and then the inverter becomes low-ohmic and transfers energy across itself. At the end of the same time interval, the electronic switch being previously low-ohmic is switched off. The switching activities of the active electronic switch(es) define the queue of low-ohmic time intervals of the first type alternating with high-ohmic time intervals of the second type, and together form a switching frequency and a duty cycle. A duty cycle or power cycle is the fraction of a period of time in which a load or circuit is active or 'on' compared to a fraction of the same period of time that the load or circuit is inactive or 'off'. There is a hard-switched DC-DC converter or—more generally—a hard-switched electronic power converter if each switch-on command and each switch-off command enters its inverter in a free timing manner from its external environment.

Though resonant waveforms are not typically similar to the waveforms of switching activities, all resonant electrical power converters or resonant DC-DC converters belong to the switch-mode power converters. The inverters of switch-mode power converters are suited very well for triggering those resonant waveforms within the resonant power converters, as to be seen at the millions of fluorescent lamp electronic ballasts and at the Class-E converters which often are used as carrier frequency power amplifiers. The resonant power or DC-DC converters deviate from the other switch-mode but hard-switched power or DC-DC converters because one of the inverter's switching activities is triggered by the timing of a resonance being at least partially active in a resonant converter and thus almost lossless, and because of the other switching activity is at least partially softened.

Generally speaking, each DC-DC converter is an electronic power circuit operated in a switch-mode, but there are hard-switched DC-DC converters and resonant DC-DC converters. All DC-DC converters form a section of the electronic switch-mode power converters, and as all inputs and outputs are DC voltages in the following, it will be named "input voltage" or "output voltage" only. The DC-DC converters transferring power between those voltages represent the power converters here, as many of the details are valid for those as well. An input voltage of a DC-DC converter may be a rectified and eventually smoothed and eventually power-factor corrected AC voltage.

At a so-called "Zero Current Switching" or ZCS as a well-known operation mode, the inverter becomes low-ohmic by its active electronic switch being triggered from its external environment at a free timing manner within certain boundaries, but this switching-on activity is partially softened by an initial zero current followed by a current ramp showing a limited slope. This is achieved by an inductor in series to the active electronic switch. Then, the inverter gets switched-off when the current through the series inductor becomes zero. Both, the limited slope of the current ramp after switching-on and the zero of the current through the active electronic switch at its switching-off timely determined by the same series inductor together with other reactive components forming a resonance, are mandatory for thyristor inverters used e.g. for huge DC-DC converters building bridges between mains' networks and static power storage plants.

When an inverter output voltage frequency or switching frequency is above 1 kHz, said hard-switched electronic power converters or DC-DC converters are used, e.g. amongst motor drives or power chargers. Both switching activities—switching-on and -off—of any of the active switches within the inverter are triggered from an external environment in a free timing manner.

At switching frequencies of about 20 kHz and above, another operation mode is used that is dual to ZCS. The semiconductors being necessary for said higher switching frequencies, particularly transistors, have significantly higher parasitic parallel capacitances than thyristors. At the same time, the switching-offs are much less critical due to the blocking capability as such and due to the speed of the fast power semiconductors. At said dual operation mode, the inverter is triggered from an external environment for any switching-off, but the output voltage of the inverter starts climbing or declining at a limited ramp slope. Here, the load-carrying current across the active switch within the inverter is redirected across a capacitance or a capacitor connected in parallel to the working path of the active electronic switch and thus limiting the ramp slope of the inverter output voltage. So, the switch configured to block can rebuild its current before a significant blocking voltage occurs which significantly reduces the switching-off losses. Said capacitance or capacitor can be the parasitic parallel capacitance of the switch itself or can be augmented by the parasitic capacitance. In other words, any capacitor, which can limit the ramp slope of an inverter's output voltage instantly after a switching-off of an active switch within the inverter, is useful because of the parasitic parallel capacitance of the switch that causes the ramp by its switching-off. Therefore, the dual operation mode is better for faster power semiconductors, particularly transistors. Hence the switching activity, timed by a resonance which at least partially controls the inverter, is the switching-on of the active electronic switch of the inverter. Due to the high parallel capacitance of the active electronic switch, parasitic or intrinsic, and even augmented externally by a parallel capacitor if necessary, the active switch may be switched on only when its forward voltage is zero or has become zero. Otherwise, the charge of this parallel capacitance will be dumped inside the switch during switching-on, not measurable externally but causing excessive switching losses. This dual operation mode is called "Zero Voltage Switching" or ZVS for this reason.

All such switching activities can be produced by the timing of at least one resonant circuit placed between an inverter and its rectifier, thus inside the power chain of a DC-DC converter which has become resonant by said placement of a resonant circuit. Said capacitance in parallel to the at least one of the inverter's active electronic switches can contribute to this resonant circuit where this contribution is a prominent feature of each Class-E converter. To reach very high switching frequencies of about 200 kHz and above, each switch-mode DC-DC converter has to use ZVS and is also intrinsically resonant because all parasitic impedances of the converter topology become effective and form a resonant circuit between inverter and rectifier within the power chain. The same effect may occur at or above switching frequencies of about 50 kHz when the output values of a DC-DC converter strongly differ from the input or supply values, for example when the output voltage is 25-times higher than the input voltage of the same DC-DC converter. This will be described in more detail below.

A lot of different topologies for switch-mode electronic power converters, particularly for DC-DC converters, are published in literature. Those DC-DC converters become as simple as possible if its' supply or input voltage always is larger than or is always less than its' output voltage. Then, intrinsically limiting topologies, like buck or boost converters, can be used. But then, voltage transfer ratios outside said topological limits cannot be produced.

Having an output voltage of a DC-DC converter larger than its input voltage after start-up and having the output voltage of the same DC-DC converter less than its input voltage after a period of time, e.g. for heating up a load of the DC-DC converter, complicates the situation significantly. The scenario may occur where a forward voltage of an LED load, which is the output voltage of the DC-DC converter above, is much higher at start-up than after several hours of operation when the LEDs become heated. One solution often used for this complicated situation is a series connection of two inversely limiting simple DC-DC converters, thus a buck converter or voltage step-down converter placed downstream of a boost or voltage step-up converter or vice versa. Another solution is a DC-DC converter topology which allows both directions of voltage transfer ratios, thus output voltages may be less than, equal, or larger than the supply voltage for the DC-DC converter named advanced DC-DC converter in the following. Aside from the four DC-DC converter topologies Flyback, çuk, Zeta, and SEPIC are known as suitable for stepping up and down, and the resonant DC-DC converters offer the same performance. An advanced DC-DC converter topology is further advantageous compared to a chain of two simple but complete converters, especially for small supply voltages of 5 V, 12 V or 24 V e.g. and for output voltages in the same region, as the losses of an extra DC-DC converter, even at the relatively high operation currents, outweigh the over-dimensioning of all components, particularly regarding blocking voltages, necessary for said advanced topologies at those relatively small supply and output voltages.

DC-DC converters may be used for very large differences, for example by a factor of 25, between input and output values of the converter. All advanced converter topologies offering voltage step-up and step-down can be equipped with an isolating transformer in the power chain of the converter, which allows the basic DC-DC converter to act as if its input and output values are nearly equal.

Small supply voltages are typical for Power-over-Ethernet (POE) applications, such as a 5 V result from a rectification of an almost rectangular data signal. The 12 V or 24 V applications are common for on-board voltages of road vehicles and tramways. Last but not least, 5 V is the basic voltage for the USB standard, which is very important for cellphone chargers. Other chargers may produce almost 19 V to supply laptop computers or other cableless devices like handheld work tools. The focus here is on the power supply circuitry of such gadgets or for LED lighting where small DC-DC converters may be powered by small DC supply voltages.

Hard-switched DC-DC converters cannot fulfill high RFI compatibility demands unlike the resonant DC-DC converters. The switching activities of the inverters of the DC-DC converters occur with minimal loss in power and in data due to very low RFI noise. As a result, the following description is focused on resonant DC-DC converters only that may step up and down. The more the inverter output voltage travels downstream of the power chain of a DC-DC converter, the more inverter output voltage becomes a "converter voltage" having the same fundamental frequency as the switching frequency of the inverter. Said differently, the "converter voltage" has substantially the same or the same fundamental frequency as the switching frequency of the inverter.

A disadvantage of resonant DC-DC converters however is a loss of controllability because a requirement of a resonant system is that it defines the timing for the one switching activity per period. The resonant system sets a possible operation region spanned by output current and voltage, which create a real output power, for the respective resonant DC-DC converter. The impedance of the resonant system e.g. defines the range of output currents. The category of the resonant system, i.e. a parallel or a serial resonant circuit, defines the character of the resonant DC-DC converter being more of a voltage source or being more of a current source as a whole. If a DC-DC converter has a character close to a voltage source, a control command mainly keeps the converter output voltage under control, independent from the output current that should be able to freely fluctuate according to the actual load. This is the main application of DC-DC converters acting as electrical power supplies. If a DC-DC converter has a character close to a current source, a control command mainly keeps the output current of the converter under control, independent from the output voltage that should be able to freely fluctuate according to the actual load. This is the main application of DC-DC converters acting as chargers or particularly acting as LED power supplies and LED electronic control gears.

Within the boundaries of its possible operation region, a resonant DC-DC converter can be controlled by altering the switching frequency in relation to the characteristics of the resonant system. Then, crosstalk may occur between the output current and output voltage which can only be controlled by complicated and very well adopted closed-loop compensations within the controller of the resonant DC-DC converter.

To minimize or eliminate any crosstalk of a varying output voltage on a constant output current a priori for a construction of a pure current source, the disclosure WO-2008/075389-A1, which is herein incorporated by reference in its entirety, proposes to connect the output of an inverter being nearly a rectangular generator to a serial resonant circuit having two times the inverter's switching frequency as resonance frequency. Then the serial impedance of the resonant circuit defines the output current dependent from the inverter's supply voltage, but completely independent from the actual output voltage. This serial resonant circuit is placed in front of a rectifier and together with it on a LED module, the LED current of which is correctly controlled by said serial impedance on the same module. A big advantage of this structure is the possibility to connect several even different LED modules to the same inverter in parallel, each having its own lossless current limiter, as long as the inverter's switching frequency equals the half of the resonance frequency of all of those different serial resonant circuits building up their different serial impedances. But instead of working in the advantageous ZVS operation mode, the inverter being nearly a rectangular generator must work in the ZCS operation mode. The first big disadvantage of this arrangement is a mismatch between its real resonant working mode and the inverter's switching frequency of at least 20 kHz. During each conduction time interval of an active switch within the inverter, the working current changes direction and even becomes zero at the end, so that no reactive power, particularly no inductive energy, remains to commutate the inverter without losses into its next low-ohmic time interval at a new inverter output voltage level. Instead of this, the inverter's active switches must switch on by a trigger from an external environment causing respectively high switch-on losses and RFI noise levels. The second big disadvantage of this arrangement is a bad dimmability. Each deviation of the inverter's switching frequency from the half of the serial impedances' resonance frequency destroys their current source character first, rather than rendering a dimming effect.

Both disadvantages from above have been resolved according to the disclosure U.S. Pat. No. 10,356,861-62, which is herein incorporated by reference in its entirety. Additionally, a common reason for a DC-DC converter having said character as close as possible to a current source is published: Single LEDs out of a series chain of several LEDs may get bridged spontaneously to render dynamic color effects e.g., but in consequence the DC-DC converter's output voltage jumps according to said bridging. This illustrates the reason why a LED-supplying DC-DC converter should be an almost pure current source. Here, its inverter is a phase-shifted full bridge having an always constant switching frequency and said phase-shift as control input. So, the inverter output repetitively shows zero voltage time slots between said first type of low-ohmic time intervals having almost constant—but bipolar different—output voltage levels. The longer the zero voltage time slots are with respect to the period of the constant switching frequency, the more the inverter is dimmed down without touching its switching frequency. This is the reason that any resonant circuit keeps its current limiting effects evenly across a whole control space or across a whole possible operation region. An auxiliary resonant pole supports that inverter's bridge leg in commutating that terminates each zero-voltage time slot by its commutation, which is state of the art for resonant phase-shifted full bridges. The circuitry between inverter and rectifier is a serial resonant circuit like above, but here the outcoupling rectifier is connected in parallel to its resonance capacitor instead of in series to it like above. Additionally, here a second inductor decouples a LED chain as load from the output of the rectifier. All measures in sum enable all four active inverter switches to work in the favorable ZVS operation mode, and the whole resonant DC-DC converter to act as an almost pure current source. Several different loads can be connected simultaneously and in parallel to the same inverter, if each load, particularly LED load, is allocated to its own rectifier and its own three resonance elements where each resonance element is adopted to its' load. The main disadvantage of this arrangement is the maximum complexity of its inverter needing at least two high-side gate or base drives and four timings being different for each active electronic switch. Because of this exclusivity and complexity, the only well-known controller is the UC3875 family from Texas Instruments that is able to control such a phase-shifted full bridge inverter. With respect to this complexity, the auxiliary resonant pole costs almost nothing except a continuous loading of one bridge leg that becomes commutated by said pole.

SUMMARY

A resonant DC-DC converter may include an inverter configured to convert a DC supply voltage into a long or medium wave radio-frequency (RF) AC voltage, having a rectifier that rebuilds another DC voltage as an output voltage from the real power of said RF AC voltage, where the output voltage can have a value being different from the DC supply voltage and is intended for delivering or feeding electrical power to a load, and having at least two resonant circuits incorporated with a single power chain between the inverter and the rectifier, whereby these resonant circuits can be designed independently of each other. At least one inductor out of these resonant circuits may comprise an isolating transformer, and two or more inductors out of these resonant circuits may be at least loosely coupled to each other.

A resonant DC-DC converter may be much less complicated than the second above-mentioned arrangement but keeps its advantages. Due to the resonant circuits acting as lossless current limiters, and that each RFI filter can be best optimized against a narrow band of noise frequencies comprising a switching frequency, the switching frequency of the resonant DC-DC converter's inverter may be kept constant during operation. Because of a requested power density, the switching frequency may be significantly above 20 kHz, thus yielding the ZVS operation mode mandatory to minimize the RFI noise production from the beginning, and to have to only filter the rest of the RFI noise. Furthermore, the resonant DC-DC converter may be controllable or dimmable despite its resonant operation at a constant switching frequency. In particular, the resonant DC-DC converter may provide an intrinsically constant output current and may behave similarly to a current source, to act as an LED-supplying power source and also to get rid of a complicated measurement and control of the output current of the converter.

It is an object of the disclosure to solve at least some of the above mentioned problems by providing a resonant DC-DC converter that may include an input for inputting the DC voltage, an output for providing a DC voltage to a load with an output rectifier consisting of rectifier diodes to convert the converter voltage into a DC output voltage, a resonant half-bridge inverter comprising two switches in series with a first serial resonant circuit to adjust the output current of the converter, and a second serial resonant circuit configured to buffer, e.g. isolate, DC voltage deviations in the converter and provide current continuity within the converter. The resonance of the first serial resonant circuit may be measured after every start-up of the converter, and the result of this measurement may define the switching frequency of the half-bridge inverter. The driving of the switches of the half-bridge inverter may include a key gap. The key gap represents the dead time between the switch on times for the respective switches. The resonance frequency of the second serial resonant circuit may be slightly above the switching frequency of the half-bridge inverter. This arrangement may not need an output current measurement because the output current may be determined by the input voltage. The output current may be determined by measuring the input voltage and comparing it to a saved minimum input voltage. The minimum input voltage is the allowed minimum of the rectified net voltage depending on national laws. For example, in Germany, no more than a 10% deviation from the net supply voltage is allowed. Hence, especially for isolated converters, a converter may be built much cheaper and more reliable without compromising other values. An isolated converter is one that has an isolation barrier between the primary and the secondary side, typically done by a transformer). This is mandatory in many countries to enhance security as the heat sink is not supposed to have line potential in a normal failure mode.

The start-up of the converter is its first start-up after powering on the converter i.e. coupling the converter to net power. The resonance frequency is measured once after start-up in the phase before continuous operation of the converter.

Depending on the measured resonance frequency of the first serial resonant circuit, the switching frequency of the half-bridge inverter is adjusted to ensure correct current output of the converter without measuring the output current.

The switching frequency is the pulse width modulation (PWM) square wave frequency for driving the two inverter switches in series.

The key-gap is a dead time in which none of the two inverter switches is switched on to avoid cross currents in the half bridge configuration of the inverter.

The static control curve defines the duty cycle to switch the inverter switches in relation to an occurring minimum of the supply voltage to ensure the needed current to the load at the output of the converter at the minimum supply voltage.

The dynamic control curve defines the duty cycle to switch the inverter switches in relation to the measured real supply voltage to ensure the needed current to the load at the output of the converter.

In a non-limiting embodiment, the load of the resonant DC-DC converter may include or consist of one or more light emitting diodes (LEDs). Because the converter acts as a current source, the converter is advantageous for driving LEDs as a load.

In one embodiment, the resonant DC-DC converter may include an output filter. Output filters are often used to enhance the quality of the DC power like the ripple current and current deviations at the output. This increases light quality, since LEDs are fast light sources.

In a non-limiting embodiment, the switching frequency of the half-bridge inverter may be fixed after start-up of the converter. Since the switching frequency is measured with respect to the resonant frequency of the first resonant circuit after start of the converter, it can be left fixed to ensure a well-adapted current source behavior of the converter.

In another embodiment, a first resonance inductance of the first resonant circuit may be similar to a second resonance inductance of the second resonant circuit.

This is advantageous for cost and logistic savings, as similar inductive components can be used for the converter.

In another embodiment, the first resonance inductance of the first resonant circuit and the second resonance inductance of the second resonant circuit may be loosely coupled. This can save some space for the converter, and thus reduce cost and space needed. The coupling factor of the inductance of the first resonant circuit and the inductance of the second resonant circuit may be below 0.5. If no core for both the first and the second resonance inductance is used as described above, a coupling factor of below 0.5 is easily achievable.

In a non-limiting embodiment, the converter is an isolated converter, such as a SELV (Safety Extra Low Voltage) converter. With this type of converter, no additional feedback loop for measuring the output current is necessary.

In another embodiment, a second resonance capacitance of the second resonant circuit is less than a first resonance capacitance of the first resonant circuit. This allows for a capacitive operation of the second resonant circuit and thus ensures Zero Voltage Switching (ZVS) for the converter switches.

In a non-limiting embodiment, the output current of the resonant DC-DC converter is adjusted via dimensioning of the first resonant circuit to ensure the correct current at the output based on an inherent current setting of the first resonant circuit. The dimensioning occurs by the first resonance inductance in Henry (H) divided by the first resonance capacitance in Farad that results in the square of a dimensioning resistance which contributes to the inherent current setting together with the actual input voltage.

In another embodiment, the first resonant circuit and the second resonant circuit can be dimensioned independently from each other. This allows for every possible output voltage and output current to benefit from inherent current adjustment together with ZVS for the converter switches.

In a further embodiment, the power output of the converter is adjusted by an asymmetrical driving of the two switches of the half-bridge to adjust the output voltage to the load, as the converter is capable of driving LED loads with a different amount of LED's in series resulting in different needed output voltages.

In another embodiment, the output rectifier is a voltage doubling Villard and Greinacher rectifier to drive LED loads with many LED's in series configuration.

It can be advantageous, if none of the resonance capacitors is switched in parallel with one of the half-bridge switches. It can also be advantageous that none of the resonance capacitors is switched in parallel with a rectifier diode. This mitigates cross-coupling between the output voltage and the output current of the converter.

It is another object of the disclosure to solve at least some of the above mentioned problems by proposing a control method for the resonant DC-DC converter, wherein the method includes the following:
- providing a static control curve based on the duty cycle and the output current,
- providing a pre-defined minimum occurring supply voltage,
- measuring a real-time supply voltage related to said minimum occurring supply voltage,
- determining a deviation between the pre-defined minimum occurring supply voltage and the measured real-time supply voltage, and
- performing a real-time multiplication of the static control curve and said deviation factor to obtain a dynamic control curve; and
- driving the two inverter switches based on the dynamic control curve. This method leads to a converter with above described advantages.

Advantageously, the static control curve may have its maximum at symmetrical driving where the duty cycle (D) is 0.5. The static control curve may have its zeros at the two points where the duty cycle (D) is 0 and 1, and the static control curve may be located symmetrically around the axis defined by said maximum. In one embodiment, the static control curve is formed by a second-order parabola being open downwards. This leads to a good utilization factor of the components and ensures minimum switching losses.

In another embodiment, the maximum of the static control curve defines the level where the dynamic control curve has to be cut for defining the two possible points at asymmetrical driving of the half bridge inverter such that the resonant DC-DC converter provides its nominal output current to the load which means the maximum rated output current of the converter. This has the advantage of easing the control of the converter and ensuring maximum utilization of the components used in the converter.

In yet another embodiment, the two possible points on the dynamic control curve move on its partitions from the maximum level downwards to a dimmed level for defining two new possible points at asymmetrical driving of the half bridge inverter such that a dimmed output current occurs. This advantageously ensures easy dimming control of the converter. This method will be explained further in the description related to FIGS. 7A-7C and 8.

With the above-mentioned measure(s), the converter may be operated without using a feedback control loop to measure the output current.

Non-limiting embodiments can be found in the dependent claims and the entire disclosure, but a distinction is not always made in detail between aspects of the device and aspects of use in the description; in any case, implicitly, the disclosure is to be read with respect to all categories of claims.

Further advantageous embodiments of the circuit arrangement of a resonant DC-DC converter result from further dependent claims and from the following description.

BRIEF DESCRIPTION OF THE DRAWINGS

Further advantages, features and details will be apparent from the following description of embodiments and from the drawings, in which identical or functionally identical elements are provided with identical reference signs. The drawings illustrate non-limiting embodiments and, together with the description, serve for explanation thereof. The elements and structures shown in the drawings are not necessarily shown to scale relative to each other.

FIGS. 5A-5E depict the traces of important voltages and currents from the embodiment depicted in FIG. 1, FIGS. 6A-6E depict the traces of some important voltages and currents from the embodiment depicted in FIG. 3, FIG. 7a depicts the design point for the resonant DC-DC converter at minimum occurring supply voltage showing a static control curve.

DETAILED DESCRIPTION OF EMBODIMENTS

Figure 1:
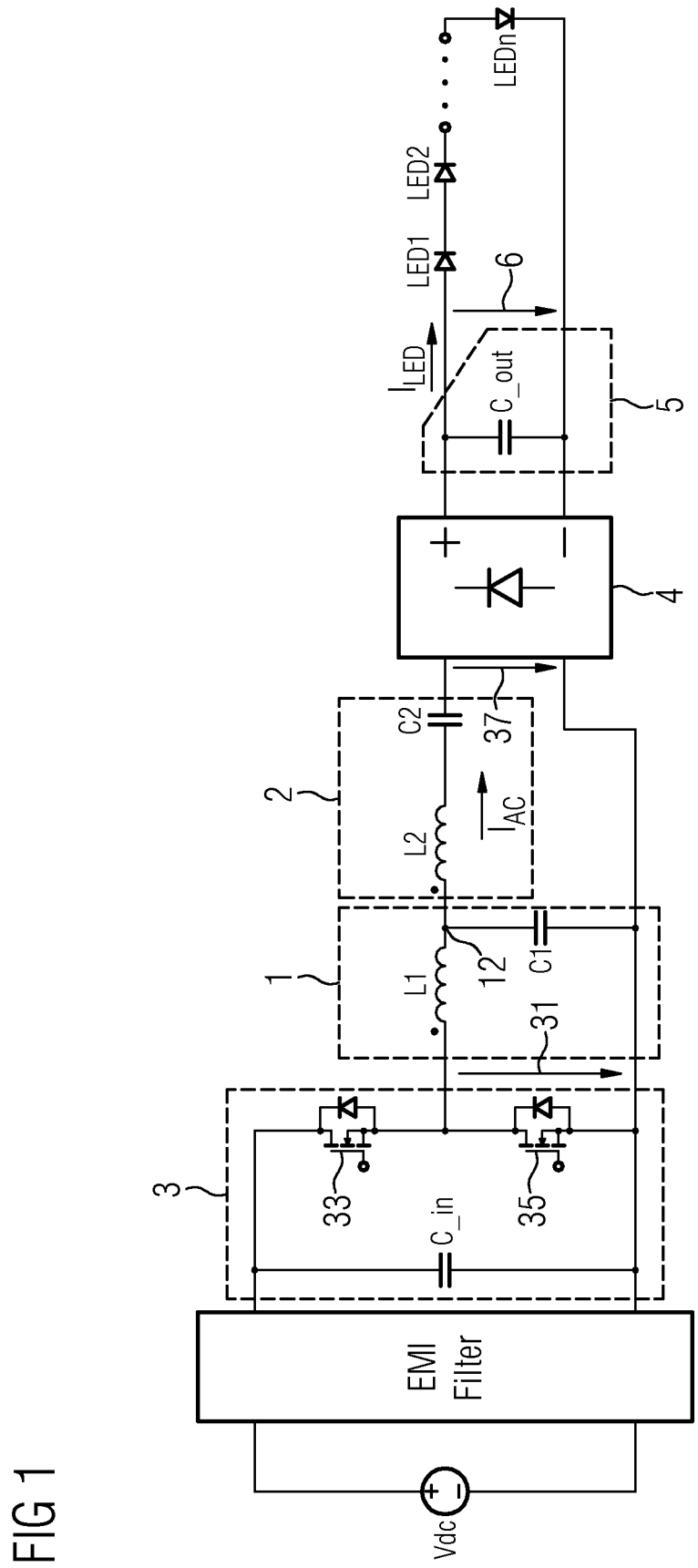
FIG. 1 depicts a non-limiting embodiment of a resonant DC-DC converter.

FIG. 1 depicts a resonant DC-DC converter as a non-limiting embodiment, having an input DC source as its energy supply Vdc on its left side, followed by an electromagnetic interference (EMI) Filter as an input filter for filtering radio frequency interferences produced by the DC-DC converter and irradiated into the mains which is terminated by a capacitor C_in. This capacitor may be a storage or smoothing capacitor at the same time. The input filter is low-ohmic and generally has a small capacitance for shorting the X-voltage ripple and has a small inductance for smoothing the x-current ripple, and should have a high inductance which can be realized by common-mode chokes for blocking the Y-voltage ripple. If necessary, a rectifier can be integrated within the input filter for POE applications, or both a mains rectifier and a power factor corrector (PFC) can be integrated there (both not shown) for standard public mains power supply. Generally speaking, C_in is charged to the DC supply voltage Vdc. The outer electrodes of a series of two active electronic inverter switches 33, 35—hereinafter referred to as converter switches—are connected to this capacitor C_in to build a half-bridge inverter 3. The connection point or midpoint between the inner electrodes of the active inverter switches 33, 35 defines the inverter output having its inverter output voltage 31. A first serial resonant circuit 1 may include an inductor L1 and a capacitor C1, which form an AC voltage to current converter, and is coupled to said midpoint or inverter output voltage 31 as its corresponding midpoint voltage, whereby the inductor L1 is directly connected to the midpoint 31. A resonance frequency between the inductor L1 and the capacitor C1 is measured at each start-up of the whole resonant DC-DC converter and defines the switching frequency to be used for a continuing operation of its half-bridge inverter 3 until a shut-down, which safeguards said conversion properties of the first serial resonant circuit 1. Because of that, the first serial resonant circuit may also be referred to as a converting resonant circuit 1. The resonance capacitor C1 may be connected with the lower outer electrode of the inverter. But the capacitor C1 can be forked as well—to half the capacity of the capacitor C1 and advantageously connect to both outer electrodes of the half-bridge inverter (not shown). A single resonance capacitor C1 can also be connected with the upper outer electrode of the half-bridge inverter only (not shown).

Coupled at a node 12 between the resonance capacitor C1 and resonance inductor L1, a second serial resonant circuit 2 may include or consist of a current 5 source inductor L2 and a blocking capacitor C2. The second serial resonant circuit 2 forms a DC blocking and current continuity branch. The second resonant circuit 2 may also be referred to as a continuing resonant circuit 2. The values of the two inductors L1 and L2 may have similar or equal values. So, two equal components comprising the same cores, bobbins, winding wires, and turns' numbers can be used for both inductors L1 and L2. The current source inductor L2 may provide continuity of a current $I_{AC}$ delivered to all downstream stages by reducing the current harmonic content within the current $I_{AC}$. The blocking capacitor C2 buffers, e.g. isolates, DC voltage deviations between inverter output voltage 31 and rectifier input voltage 37 of the resonant DC-DC converter. Thus, the blocking capacitor C2 blocks any DC current component within the current $I_{AC}$ through the current source inductor L2 in series to the capacitor C2 and through the input of the downstream output rectifier 4. The input voltage is a converter voltage 37 and has the same frequency as the switching frequency of the half-bridge inverter 3. The output rectifier 4 may be a full-wave rectifier having four fast rectifier diodes in Graetz bridge configuration. The output filter 5 may include one filter capacitor C_out that is connected directly in parallel with the rectifier's output and may be recharged to a DC output voltage 6 by the output current of the rectifier 4. The discharge current $I_{LED}$ powers the load, such as at least one LED or a LED string having a series connection of LED1, LED2, etc., until LEDn, which are connected in parallel to the filter capacitor C_out. Thus, the sum of the forward voltages of each LED connected to the filter capacitor C_out or to the output filter 5 equals the DC output voltage 6.

The blocking capacitor C2 may have a set value such that together with the current source inductor L2, the second serial resonant circuit 2 may have a resonance frequency above or at least slightly above the switching frequency of the inverter. With the inductivities of the inductors L1 and L2 being equal or substantially equal, the capacity of the blocking capacitor C2 is less than or at least slightly less than the capacity of the resonance capacitor C1. Though the second serial resonant circuit 2 may be operated below its resonance and is thus capacitive with respect to the inverter's switching frequency, it is this measure that maintains the zero-voltage switching or ZVS operation mode for both active switches 33, 35 of the half-bridge inverter 3. Mirrored by a "Tau" having both inductors L2 and L1 in its bar and the resonance capacitor C1 in its pole, the blocking capacitor C2 may provide sufficient reflected inductive impedance for the inverter output 31 and reflects sufficient but not too much inductive energy back to half-bridge inverter 3 as needed for the ZVS operation mode.

When the first serial resonant circuit 1 comprising L1 and C1, forming the AC voltage to current converter, is driven at its resonance frequency being the switching frequency fsw of the half-bridge inverter 3, where L1 is connected directly to the midpoint 31, and if a pure alternating current $I_{AC}$ is drained from the node 12 between L1 and C1 by said second serial resonant circuit 2 in a capacitive mode, then the root mean square of the output rectifier's input current $I_{AC}$ follows the formula $$I_{ACrms} = 8 * f_{sw} * Vdc/L1$$

and becomes completely independent of the load value as long as the static resistance value of the actually connected load is not higher than a hundred times the dimensioning resistance given by the square root of the first resonance inductance in Henry divided by the first resonance capacitance in Farad. The output current $I_{LED}$ is equal to the rectified value of $I_{AC}$, and the switching frequency fsw and the resonance inductivity L1 are fixed values, so the output current only depends on the input voltage Vdc, which makes a complicated measurement and closed-loop control of the output current superfluous. The resonant DC-DC converter is advantageous for this reason.

Additional benefits include autonomy of both serial resonant circuits 1 and 2, the AC voltage to current converter out of L1 and C1, and the DC blocking and current continuity branch out of L2 and C2, from the switching activities of the inverter 3 and the converting activities of the rectifier 4. Then, an intrinsic current stability is possible. A zero-output voltage is no problem because the resonant DC-DC converter automatically limits its output short-circuit current to its intrinsic current. Both stabilities, for intrinsic output current and against output short-circuits, are possible if both serial resonant circuits, the converting resonant circuit 1 and the continuing resonant circuit 2, act independently from the inverter and rectifier because no time-dependent or time-sequential or repetitive modifications of any resonant circuit caused by these operations may occur. Otherwise, the effective resonance frequency of any resonant circuit would be modified yielding the resonant circuits' characteristics as effective which causes crosstalk between the output voltage and output current. To avoid this crosstalk, the resonance elements are neither directly paralleled by an active inverter switch nor by a rectifier diode or similar component.

Figure 2:
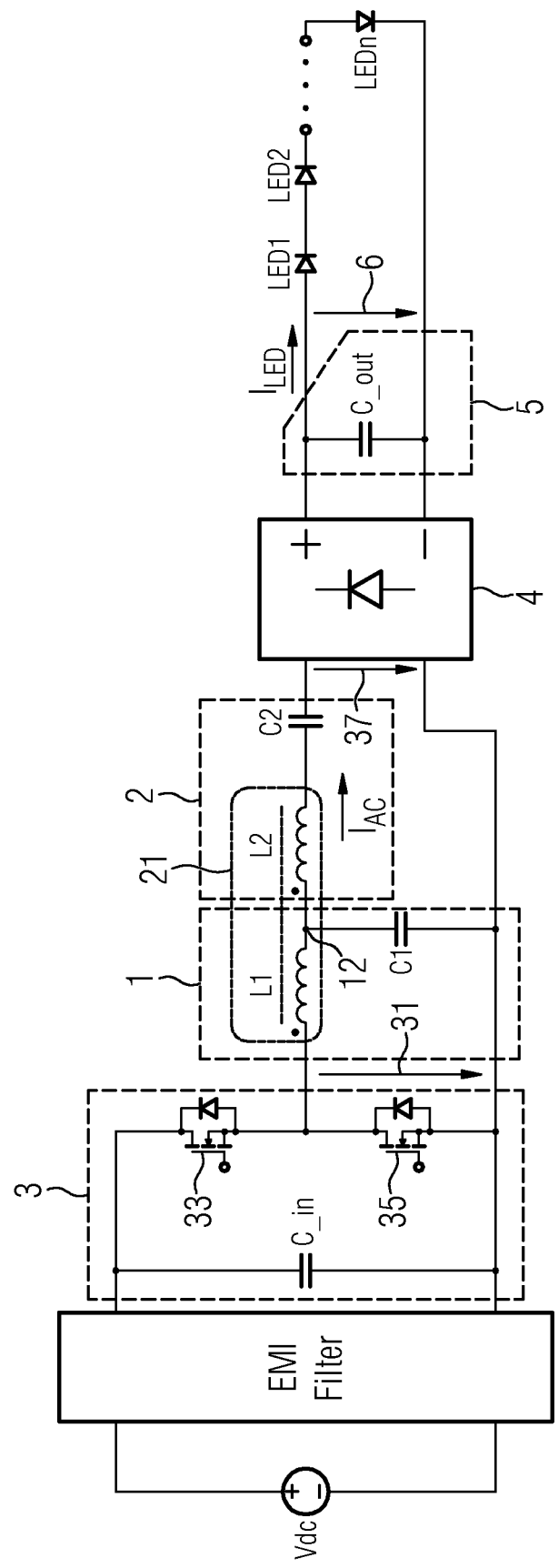
FIG. 2 depicts a non-limiting embodiment of the resonant DC-DC converter with loosely coupled inductors.

FIG. 2 illustrates a loose coupling 21 between the inductors L1 and L2. Doing so, a core and some space may be saved, but the coupling factor must be less than 0.5 to keep the functions of the involved resonant circuits 1 and 2 different enough to preserve the advantages of the topology disclosed herein. Also important is the orientation of the windings within the inductors to be coupled to each other within the loose coupling 21. The loose coupling 21 has windings that are oriented opposite to the inverter 3. The loosely coupled component 21 has no core, so this allows for a coupling factor below 0.5. "Loosely coupled" as used herein refers to a coupling factor of an inductance of a first serial resonant circuit and an inductance of a second serial resonant circuit being below 0.5, which results in a bifilar air choke having equal turn numbers for L1 and L2 and thus equal values for both single inductors, respectively.

Figure 3:
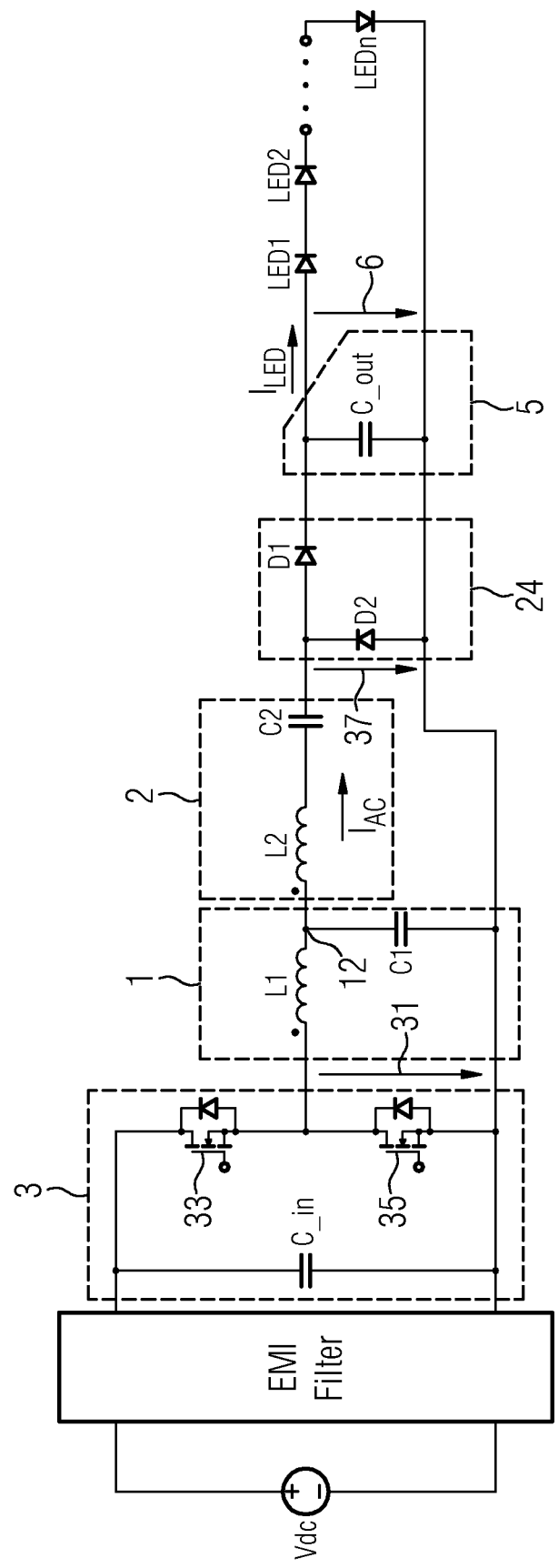
FIG. 3 depicts a non-limiting embodiment of the resonant DC-DC converter employing a voltage-doubling rectifier.

FIG. 3 is similar to FIG. 1 but replaces the general rectifier 4 with a voltage-doubling rectifier 24 comprising two equally oriented and serially connected fast rectifier diodes D1 and D2 according to Greinacher i.e., supplied at its midpoint by a DC blocking capacitor C2, and according to Villard e.g., thus with pure AC current $I_{AC}$. Modified like this, the resonant DC-DC converter has about double its original output voltage and about half of its original output current and obtains a general ground line connected to both the lower ends of C_in and C_out as another big advantage that the Graetz bridge output rectifier 4 does not have. The only disadvantage of the circuit depicted in FIG. 3 is the relatively low voltage and thus high current in the region around node 12 between both resonant circuits 1 and 2. But a doubling of an output voltage of the resonant DC-DC converter could be generally advantageous particularly at very low input or supply voltages Vdc of 5 V or 12 V e.g. for operating LED loads.

Figure 4:
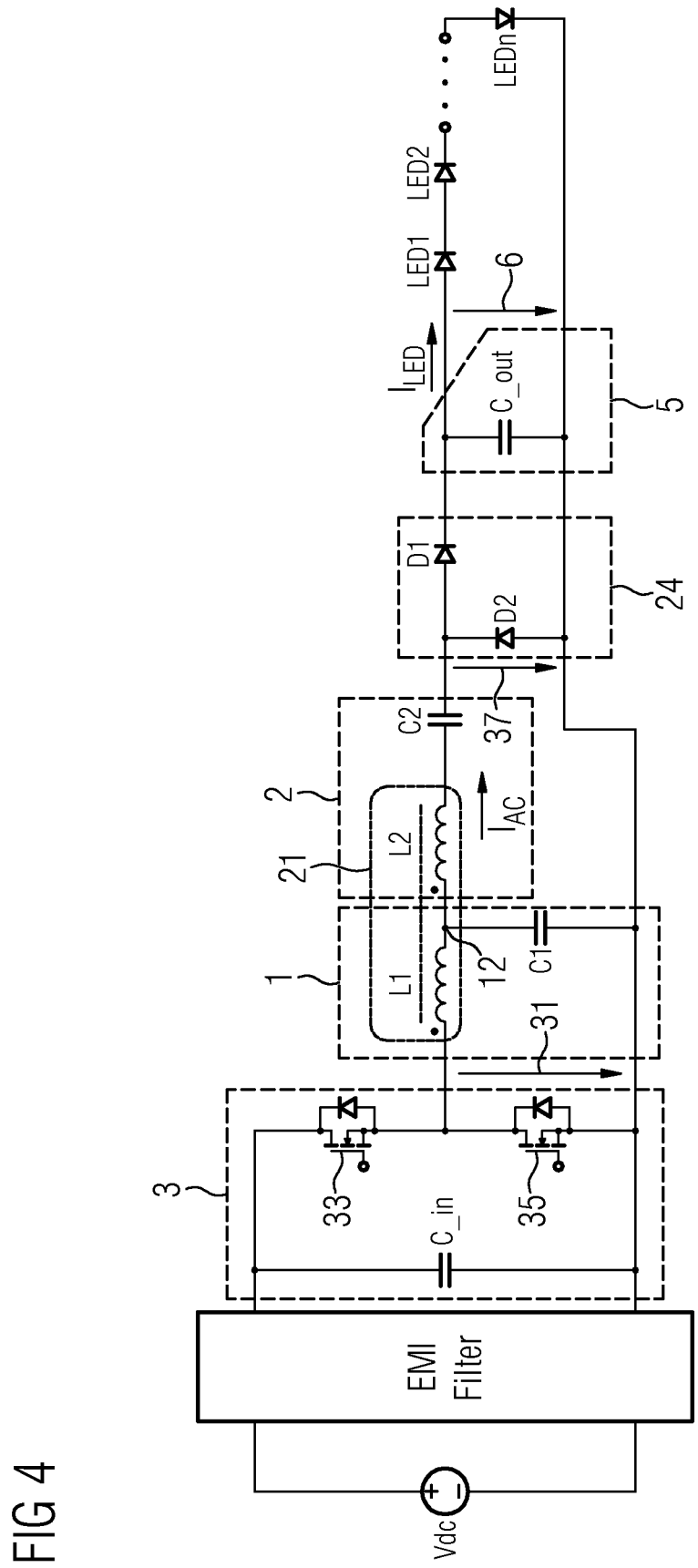
FIG. 4 depicts a non-limiting embodiment of the resonant DC-DC converter with loosely coupled inductors and employing a voltage-doubling rectifier.

FIG. 4 is similar to FIGS. 2 and 3, i.e. a loose coupling 21 between the two inductors L1 and L2 is depicted, as well as a voltage-doubling rectifier 24. The differences, advantages, and limitations regarding coupling factor and windings' orientations are the same here like described for FIG. 2.

FIGS. 5A-5E show the traces of some crucial voltages and currents in a circuit according to the first embodiment of FIG. 1. The two traces G_down and G_up of FIG. 5A illustrate the control signals for the two active inverter switches 33, 35 where a high level indicates a conducting switch and a low level a blocking switch. Seen together with the trace of FIG. 5B, this means that G_down is the control signal for the lower switch 35 and that G_up is the control signal for the upper switch 33 of the half bridge inverter 3. FIG. 5B illustrates the inverter output voltage 31 being the input voltage for the first resonant circuit 1 or AC voltage to current converter including or consisting of L1 and C1. The inverter output voltage 31 has a constant low level when the lower active inverter switch is conducting and a constant high level when the upper active inverter switch is conducting. FIG. 5C shows the current I(L1) through the resonance inductor L1, i.e. the inverter output current. The maintenance of the ZVS conditions can be recognized from this. When the inverter output voltage goes down, the inverter output current remains positive, and if the inverter output voltages goes up, the inverter output current remains negative. The current is lagging its driving voltage, and the complete load behaves inductively. Therefore, there is always enough inductive energy available to help the half bridge inverter 3 commutate to a new output voltage 31 level. So, each active inverter switch is turned on without voltage to minimize losses and minimize RFI noise. The dead times or key gaps between the control signals G_down and G_up in FIG. 5A are mandatory for this ZVS operation mode to allow the half-bridge inverter 3 enough time to commutate to its new output voltage. FIG. 5D shows the trace of the current $I_{AC}$ through the blocking capacitor C2 and into the output rectifier 4, the capacitive tuning of which can be recognized by the repetitive concave sections of this trace. FIG. 5E shows the flat trace of the output current $I_{LED}$ of the whole resonant DC-DC converter, the current of which is smoothed by the output filter capacitor C_out and is outputted to power a load, such as a LED string.

FIGS. 5A and 5B show the half bridge inverter 3 being driven asymmetrically. This operation is called "duty cycle control" and is rarely used in combination with resonant half bridge inverters. When driven symmetrically, or even driving with a duty value being D=0.5, each resonant half-bridge inverter transmits its maximum power, and the control becomes asymmetric, and less power is transmitted. More details will be explained in FIG. 7A. Since a real supply voltage Vdc is larger than a minimum occurring supply voltage, the counteraction of said duty cycle control is a duty value shift versus values being above or below D=0.5 as further explained in FIG. 7B. As already mentioned regarding FIG. 5A, dead times or key gaps between the control signals G_down and G_up are mandatory for a smooth operation of each half-bridge inverter, as seen in FIG. 5B showing its output voltage 31. Its slopes are not vertical. And—typical for an asymmetrical driving—the slope following a shorter on-time, i.e. within one switching period of the voltage 31, depicted by the shorter horizontal section of the trace within the switching period, rises or falls faster than the slope following a longer on-time, i.e. within the same switching period of the voltage 31, depicted by the longer horizontal section of the trace within the switching period. In asymmetrical driving, there is always a time period that is shorter than the other, which is what is referenced with respect to "shorter" on-time and "longer" on-time. Here, voltage 31 falls faster than it rises, as the high-side switch 33 conducts for a shorter time than the low-side switch 35.

FIGS. 6A-6E show the same voltage and current traces like FIGS. 5A-5E but with a resonant DC-DC converter having a voltage-doubling output rectifier 24 from FIG. 3 employing only two rectifier diodes D1 and D2 therein. FIG. 6E depicts half of the output current value $I_{LED}$ with respect to FIG. 5E. The current $I_{AC}$ through the blocking capacitor C2 from both FIGS. 5D and 6D highlights another difference between the circuits depicted in FIGS. 1 and 3, respectively. Here in FIG. 6D, the trace of $I_{AC}$ is much more asymmetrical than the trace in FIG. 5D. Because of the asymmetrical output rectifier 24, the original pure blocking capacitor C2 becomes a pumping capacitor on top, which causes the voltage to double. The repetitive interchanging activities "recharging" and "pumping" and the halved pulse frequency for charging the output filter capacitor C_out causes the higher asymmetry. Apart from that, all traces of FIGS. 6A-6C are almost equal to that of FIGS. 5A-5C, generally illustrating that the resonant DC-DC converter is suitable for a intrinsically output current stability.

FIG. 7a shows a design parameter for the DC-DC converter. At symmetrical driving with a duty cycle value D=½, each resonant DC-DC converter showing a half-bridge inverter transmits a maximum power, and the $I_{LED}$ is ensured to build up the maximum output voltage as specified in the requirements for the DC-DC converter. As the driving becomes asymmetrical, less power is transmitted. The orientation of this asymmetry, whether it is the upper or the lower active inverter switch 33, 35 conducting longer, does not affect this power reduction. The design parameter, at a minimum occurring DC supply voltage $V_{dcMin}$ to be stored or otherwise memorized in the converter's controller, at nominal, i.e. maximum rated, output current $I_{LED}$, and at maximum specified output voltage, is at the edge of a possible operation region where each control may become disengaged. "Nominal current" as used herein refers to a quantifiable amount of current that would be expected to flow through a circuit at any given time based on the relationship of power (watts)=potential energy (volts)× Amps (intensity of electrical current).

For all other operating points having less input current, such as at a DC supply voltage Vdc being higher than its minimum $V_{dcMin}$, the static characteristic of the duty cycle control or asymmetrical driving for pure-AC rectified electrical output values is a part of a $2^{nd}$ order parabola 71, herein referred to as a design parabola or static control curve and memorized in the controller as well. The $2^{nd}$ order parabola is symmetrical around a duty cycle value D=½ and has a maximum at $I_{LED}$, is open downwards, and has two zero points on the D-axis of the respective graph at D=0 and at D=1, i.e. extremely asymmetrical driving. At a static duty cycle of any value D and at a switching frequency on resonance between L1 and C1, the output power increases proportional to an increasing supply voltage Vdc. This turns into a growth of the output current $I_{LED}$ being proportional to an increase of Vdc where the output voltage 6 is fixed by the forward voltage of a load, such as a LED string. The supply voltage fluctuation is the only remaining disturbance based on the intrinsic current stability, more particularly the pre-determined and constant $I_{LED}$-to-Vdc ratio, which is ensured by the topology of the resonant DC-DC converter and which is verified by measurement of the L1-C1 resonance frequency at each start-up.

Figure 7B:
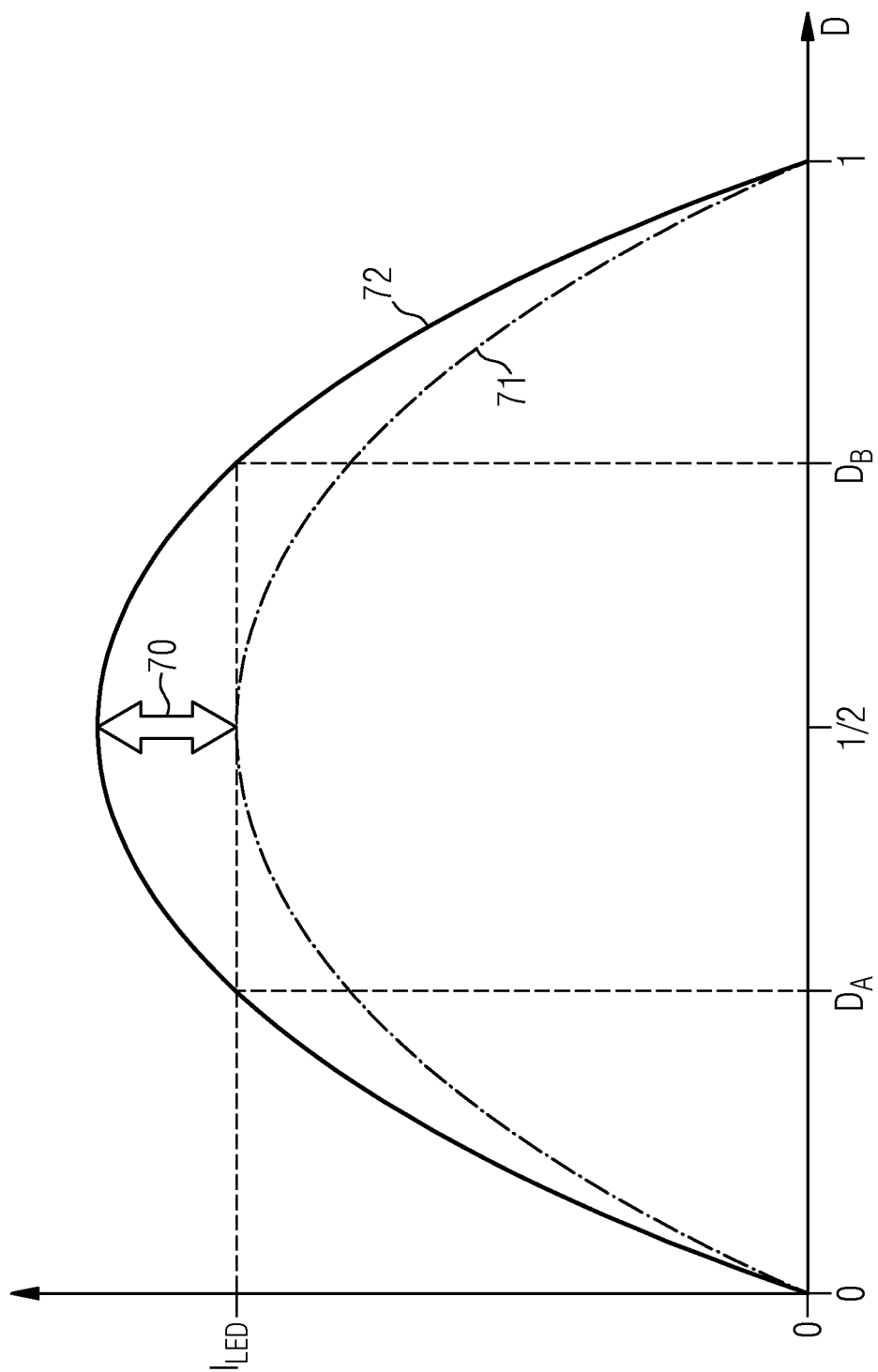
FIG. 7b depicts a normal operating point showing a dynamic control curve.

FIG. 7b shows a real operation point having the supply voltage Vdc being higher than $V_{dcMin}$, as mentioned from above. Then, the counteraction of the duty cycle control is an asymmetrical driving via a duty cycle value shift off D=½. For that, just the supply voltage Vdc must be measured and compared with said minimum occurring supply voltage $V_{dcMin}$ to determine a deviation factor 70. In other words, the actual supply voltage Vdc is measured relative to the memorized or pre-defined $V_{dcMin}$ stored in the controller. According to the static control curve 71, a second parabola or a dynamic control curve 72 is derived from the design parabola 71 by enlarging all values by said deviation factor 70, more exactly by said factor >1 between Vdc and $V_{dcMin}$. Two duty cycle points $D_A$ and $D_B$ can be determined which fit to the deviation factor 70 between measured value Vdc and pre-determined minimum occurring value $V_{dcMin}$ of the DC supply voltage. Cutting the second parabola 72 at the maximum height of the design parabola 71 yields the two fitting points $D_A$<½, when e.g. the low-side active inverter switch 35 is conducting shorter, and $D_B$>½ exactly symmetrically with $D_A$ around D=½, when e.g. the high-side active inverter switch 33 is conducting shorter. With this, the control of the output current $I_{LED}$ of the resonant DC-DC converter has been altered to its input which is very advantageous for each converter having an isolation transformer. The $I_{LED}$-to-Vdc ratio must be input into the resonant DC-DC converter by design and must be verified by measurement of the L1-C1 resonance frequency and by synchronization of the inverter's switching frequency on it at each start-up to keep this control method reliable and exactly working. When the actual supply voltage Vdc accidentally—e.g. during ramp-up or mains fault—is less than the minimum occurring supply voltage $V_{dcMin}$ in normal circumstances, the deviation factor 70 becomes <1, such that there are no intersections between the horizontal at the maximum of the design parabola 71 and the dynamic control curve 72. The duty cycle value remains at D=0.5 which defines the situation with Vdc=$V_{dcMin}$ (FIG. 7A) and the situation with Vdc<$V_{dcMin}$ (not shown).

The supply voltage Vdc given for the traces of FIG. 5 is a bit higher than the minimum occurring voltage $V_{dcMin}$ as the duty cycle value for its asymmetrical driving is not far from D=0.5, and because said maximum at a duty cycle ratio D=½ within the dynamic control curve 72 is part of a rounded peak. Thus, a lot of duty cycle shift is necessary to compensate for a supply voltage deviation factor 70 being less than the level of $I_{LED}$ like shown here in FIG. 7b, and vice versa: As the duty cycle ratio shown in FIG. 5 is larger than $D_A$ or less than $D_B$ respectively, the actual supply voltage Vdc from FIG. 5 is less than depicted here in FIG. 7b and just a little higher than the minimum occurring voltage $V_{dcMin}$.

Figure 7C:
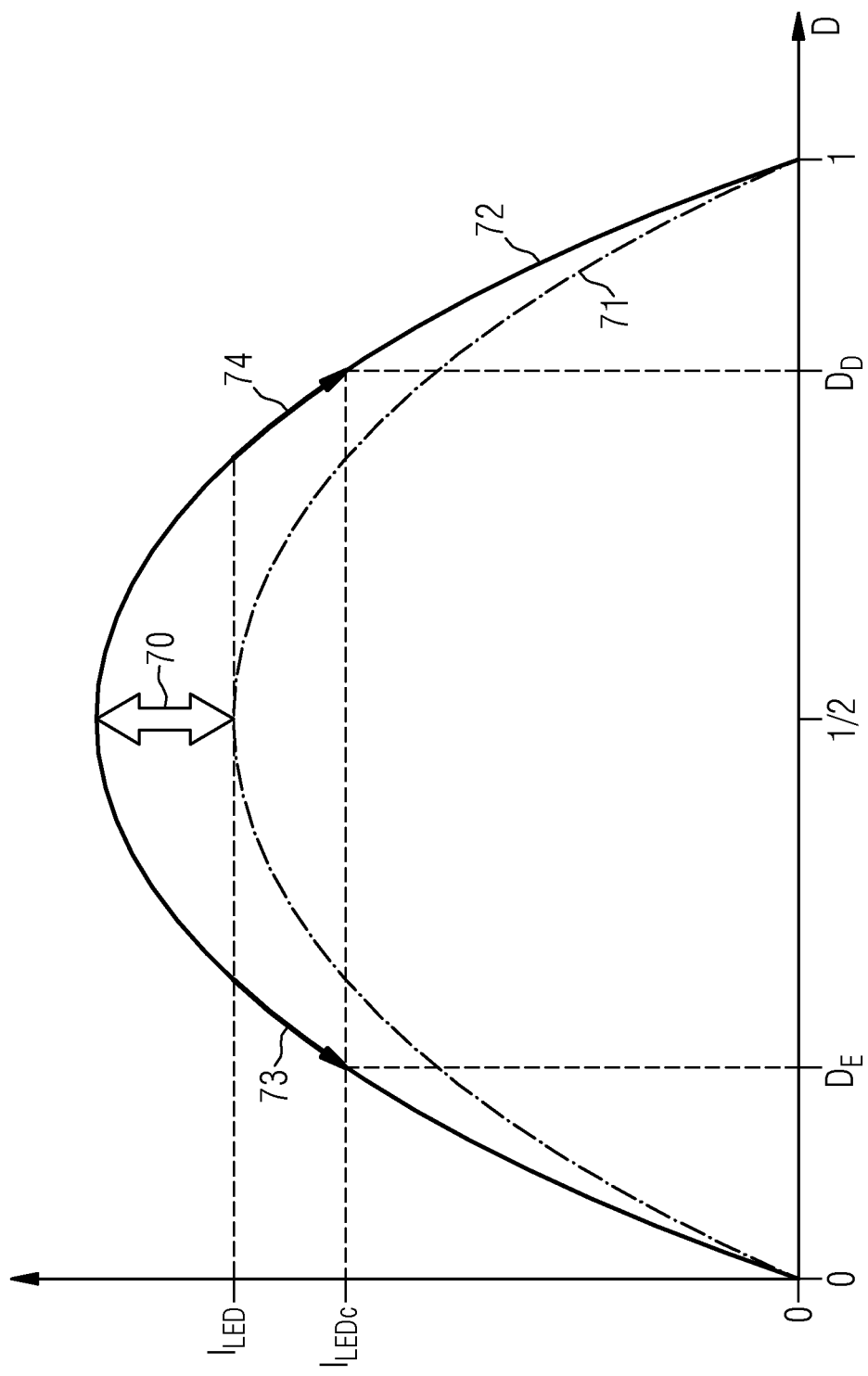
FIG. 7c depicts a dimmed operating point.

In FIG. 7c, the designed or nominal, i.e. maximum rated, output current $I_{LED}$ is depicted versus lower values $I_{LEDc}$. The second parabola 72 is proportional to the actual Vdc value. Therefore, the second parabola 72 is the dynamic control curve and is followed along its short partitions 73 and 74 originating at the level $I_{LED}$ and heading downwards to the lower level $I_{LEDc}$ for determining new duty cycle points $D_E$<$D_A$ and $D_D$>$D_B$ fitting to the new and dimmed output current $I_{LEDc}$, wherein $D_D$ again is exactly symmetrical with $D_E$ around D=½. When the half-bridge inverter 3 works asymmetrically according to a duty cycle value D=$D_E$ or D=$D_D$, then a dimmed output current of the desired value $I_{LEDc}$ occurs. Thus, the dimmability of the LED strings as loads of the resonant DC-DC converter driven by the control shown above has been demonstrated.

Figure 8:
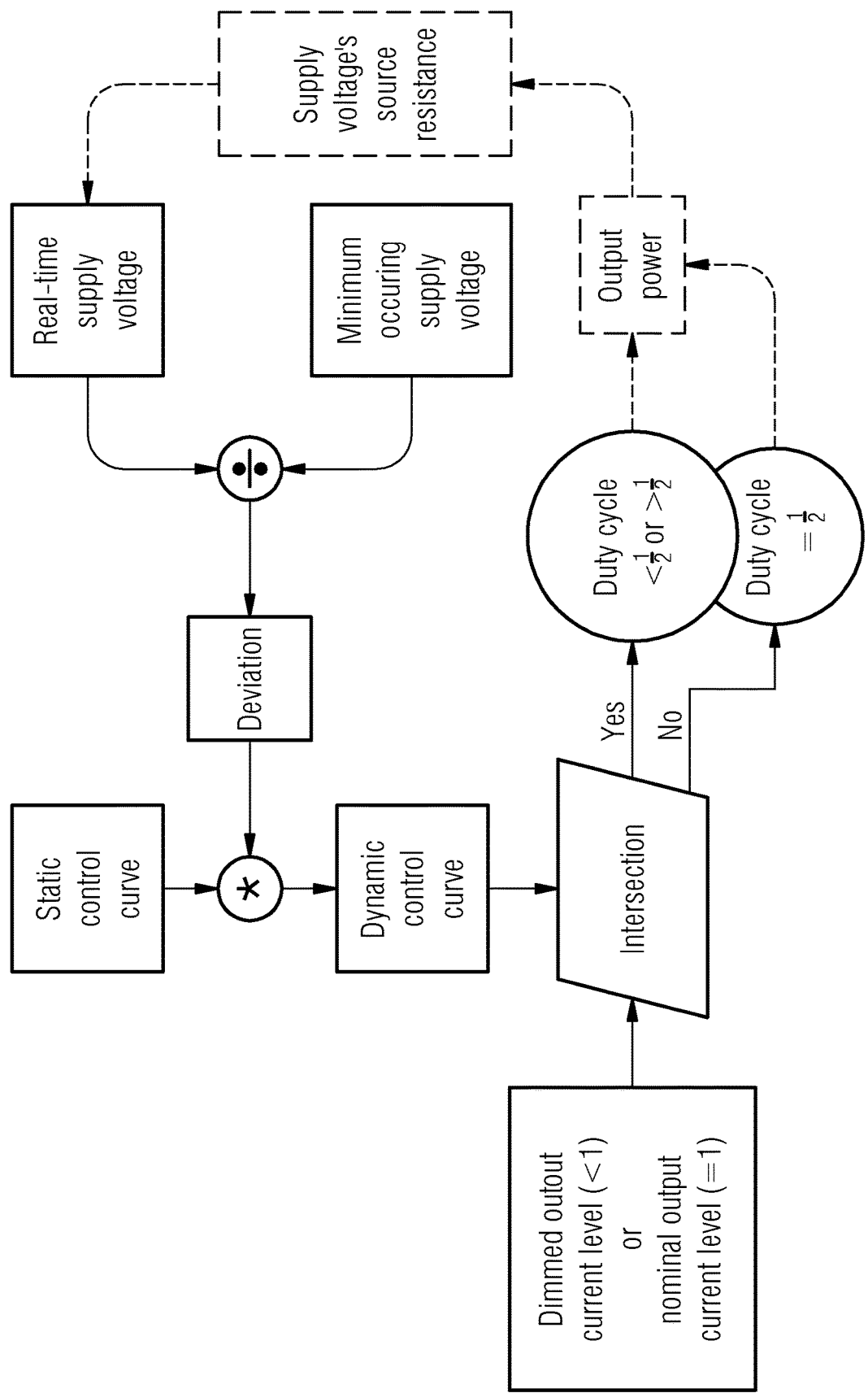
FIG. 8 depicts a flow diagram for a control method.

FIG. 8 depicts a control method for determining the inputs from the FIGS. 7A-7C. The actual supply voltage is measured in real-time, and all results are permanently divided by the value of the pre-determined minimum occurring supply voltage which value is stored or otherwise memorized in the controller of the resonant DC-DC converter. In other words, the actual supply voltage is measured relative to the pre-determined minimum occurring supply voltage. This yields a deviation factor, and a static control curve may be multiplied with the deviation factor to obtain a dynamic control curve. Said static control curve is pre-determined and stored in the controller of the resonant DC-DC converter. Then, an intersection process takes place like described in the following. The desired output current level is divided by the maximum rated output current yielding a current output level <1, and a current output level=1 is obtained when at a maximum the nominal or rated output current is desired. The current output level becomes intersected with the dynamic control curve yielding in most cases two intersection points. The corresponding duty cycle values are <½ and >½ and are symmetrical around a duty cycle=½ and such two symmetrical values may be used as possible inputs for the half-bridge inverter of the resonant DC-DC converter. All sections described above are depicted in solid lines as they represent the controller. If there is no intersection, the duty cycle=½ remains unchanged.

All boxes representing the power and its effects are depicted in dashed lines. The resonant DC-DC converter pulls an output power from its supply voltage source according to the dynamic duty cycle values as inputted into the resonant DC-DC converter. This influences the actual or real-time supply voltage, mostly for the lower values of the real-time supply voltage the more output power is pulled. Reason for the lower values is the source resistance of the supply voltage source. The portion of FIG. 8 controlled or determined by the DC-DC converter is represented by the action boxes having a solid boundary line. The source resistance builds a closed loop because the modification of the control curve by the resonant DC-DC converter modifies an input value for the real-time supply voltage.

TABLE OF REFERENCE DESIGNATORS

1 First resonant circuit or an AC voltage to current converter
2 Second resonant circuit or a DC blocking and current continuity branch
3 Half-bridge inverter
4 Output rectifier employing a Graetz bridge
24 Output rectifier employing a Greinacher and Villard circuit
5 Output filter
6 DC voltage at the output of a resonant DC-DC converter
12 Node between first and second resonant circuits
21 Loose coupling between both resonant circuits
31 Inverting half-bridge's output voltage or output port or midpoint
33 High-side switch
35 Low-side switch
37 Converter output voltage or converter voltage or rectifier input voltage
70 Input or DC supply voltage deviation 71 Design parabola or static control curve
72 Operation parabola or dynamic control curve
73 Dynamic control curve's partition for dimming with D less than ½
74 Dynamic control curve's partition for dimming with D larger than ½

The invention claimed is:

1. A resonant DC-DC converter device comprising:
   an input for inputting a DC supply voltage;
   an output configured to provide a DC output voltage and an output current to a load;
   an output rectifier consisting of rectifier diodes configured to convert a converter voltage into the DC output voltage;
   a resonant half-bridge inverter comprising two switches in series configured to convert the DC supply voltage into the converter voltage;
   a first serial resonant circuit configured to adjust the output current; and
   a second serial resonant circuit configured to block a DC current flow in the converter and provide current continuity within the converter;
   wherein a resonance of the first serial resonant circuit is measured after every start-up of the converter and each measurement defines a switching frequency of the half-bridge inverter; wherein the driving of the half-bridge inverter includes a key gap during operation thereof;
   wherein the resonance frequency of the second serial resonant circuit is above the switching frequency of the half-bridge inverter.

2. The resonant DC-DC converter as claimed in claim 1, wherein the load comprises or consists of one or more light emitting diodes (LEDs).

3. The resonant DC-DC converter as claimed in claim 1, further comprising an output filter.

4. The resonant DC-DC converter as claimed in claim 1, wherein the switching frequency of the half-bridge inverter is fixed once the resonant DC-DC converter has started up.

5. The resonant DC-DC converter as claimed in claim 1, wherein the resonant DC-DC converter is a SELV (Safety Extra Low Voltage) converter.

6. The resonant DC-DC converter as claimed in claim 1, wherein the output rectifier is a voltage doubling Villard rectifier or Greinacher rectifier.

7. The resonant DC-DC converter as claimed in claim 1, wherein an inductance of the first serial resonant circuit is equal to an inductance of the second serial resonant circuit.

8. The resonant DC-DC converter as claimed in claim 7, wherein the inductance of the first serial resonant circuit and the inductance of the second serial resonant circuit are loosely coupled.

9. The resonant DC-DC converter as claimed in claim 8, wherein a coupling factor of the inductance of the first serial resonant circuit and the inductance of the second serial resonant circuit is below 0.5.

10. The resonant DC-DC converter as claimed in claim 7, wherein a capacitance of the second serial resonant circuit is less than a capacitance of the first serial resonant circuit.

11. The resonant DC-DC converter as claimed in claim 1, wherein the first resonance circuit and/or the second resonance circuit comprises one or more capacitors; wherein none of the one or more capacitors is switched in parallel to one of the switches of the resonant half-bridge inverter.

12. The resonant DC-DC converter as claimed in claim 1, wherein the first resonance circuit and/or the second resonance circuit comprises one or more capacitors; wherein none of the one or more capacitors is switched in parallel to one of the rectifier diodes.

13. The resonant DC-DC converter as claimed in claim 1, wherein the output current is adjusted via dimensioning of the first serial resonant circuit based on an occurring minimum of the DC supply voltage.

14. The resonant DC-DC converter as claimed in claim 13, wherein the first serial resonant circuit and the second serial resonant circuit are configured to be dimensioned independently from each other, such that the output current occurs independently from an output voltage when the load is connected.

15. The resonant DC-DC converter as claimed in claim 14, further comprising a power output that is adjustable by driving the two switches of the resonant half-bridge inverter with a pulse width modulation (PWM) having a pre-defined duty cycle within the inverter.

16. A control method for the resonant DC-DC converter as claimed in claim 1, wherein the control method comprises:
    providing a static control curve based on a duty cycle and the output current,
    providing a pre-defined minimum occurring supply voltage,
    measuring a real-time supply voltage related to said minimum occurring supply voltage,
    determining a deviation factor between the pre-defined minimum occurring supply voltage and the measured real-time supply voltage, and
    performing a real-time multiplication of the static control curve and said deviation factor to obtain a dynamic control curve;
    driving the two inverter switches based on the dynamic control curve.

17. The control method as claimed in claim 16, wherein the static control curve comprises:
    a maximum at a symmetrical driving point where the duty cycle is 0.5;
    zeros at two points where the duty cycle is 0 and 1; and
    the static control curve is symmetrically arranged around the axis defined by said maximum.

18. The control method as claimed in claim 17, wherein the static control curve is formed by a second-order parabola being open downwards.

19. The control method as claimed in claim 17, further comprising:
    determining a level to cut the dynamic control curve based on the maximum of the static control curve;
    determining two possible points at the cut of the dynamic control curve; and
    asymmetrically driving the half bridge inverter to provide an adjusted output current to the load.

20. The control method as claimed in claim 19, further comprising:
    determining two new duty cycle points by moving the two possible points from a maximum level downwards; and
    asymmetrically driving the half bridge inverter to provide an output current to the load where the output current is less than the adjusted output current for the load.

* * * * *